US009298680B2

(12) United States Patent
Gorga et al.

(10) Patent No.: US 9,298,680 B2
(45) Date of Patent: Mar. 29, 2016

(54) DISPLAY OF HYPERTEXT DOCUMENTS GROUPED ACCORDING TO THEIR AFFINITY

(71) Applicant: International Business Machines Corporation, Armonk, NY (US)

(72) Inventors: Ilaria Gorga, Rome (IT); Edoardo Turano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 14/011,198

(22) Filed: Aug. 27, 2013

(65) Prior Publication Data

US 2014/0059423 A1    Feb. 27, 2014

(30) Foreign Application Priority Data

Aug. 27, 2012  (GB) .................................. 1215208.8

(51) Int. Cl.
*G06F 17/22*    (2006.01)
*G06F 17/30*    (2006.01)

(52) U.S. Cl.
CPC ........ *G06F 17/2247* (2013.01); *G06F 17/3071* (2013.01); *G06F 17/30864* (2013.01)

(58) Field of Classification Search
CPC ... G06F 3/0481; G06F 3/0482; G06F 3/0483; G06F 3/1297; G06F 9/4443; G06F 17/2247
USPC .................................................. 715/234, 777
See application file for complete search history.

(56) References Cited

U.S. PATENT DOCUMENTS

| | | | |
|---|---|---|---|
| 5,581,682 A * | 12/1996 | Anderson ............. | G06F 17/241 715/236 |
| 6,313,855 B1 * | 11/2001 | Shuping ................ | G06F 3/0481 707/E17.111 |
| 6,460,060 B1 | 10/2002 | Maddalozzo, Jr. et al. | |
| 7,747,626 B2 | 6/2010 | Grimm et al. | |
| 8,631,343 B1 * | 1/2014 | Rana .............................. | 715/781 |
| 8,713,465 B1 * | 4/2014 | Jitkoff et al. .................. | 715/777 |
| 8,881,032 B1 * | 11/2014 | Weber et al. .................. | 715/760 |
| 2003/0217359 A1 * | 11/2003 | Ohi et al. ....................... | 717/174 |
| 2004/0093562 A1 * | 5/2004 | Diorio et al. .................. | 715/513 |
| 2006/0271858 A1 | 11/2006 | Yolleck et al. | |
| 2008/0005686 A1 * | 1/2008 | Singh .......................... | 715/764 |
| 2008/0065237 A1 | 3/2008 | Long | |
| 2008/0072146 A1 * | 3/2008 | Sung et al. .................... | 715/273 |

(Continued)

OTHER PUBLICATIONS

Report under Section 17(5)(b) dated Dec. 7, 2012, Application No. GB1215208.8, 5 pages.

(Continued)

*Primary Examiner* — Andrew Dyer
(74) *Attorney, Agent, or Firm* — Francis Lammes; Stephen J. Walder, Jr.; Joseph Petrokaitis (57) ABSTRACT

A mechanism is provided for accessing hypertext documents on a data processing system. A plurality of selected documents are opened. An affinity indicator is calculated for each pair of selected hypertext documents according to a comparison between semantic information of a content of each selected hypertext document of the pair. The selected hypertext documents are grouped into a set of groups by assigning each selected hypertext document to at least one group in the set of groups according to the affinity indicators. The selected hypertext documents are then displayed in an arrangement corresponding to the grouping thereof.

17 Claims, 6 Drawing Sheets

(56) References Cited

U.S. PATENT DOCUMENTS

| | | |
|---|---|---|
| 2008/0184158 A1 | 7/2008 | Selig |
| 2009/0055729 A1* | 2/2009 | Audet .......................... 715/243 |
| 2010/0031166 A1 | 2/2010 | Choudhary et al. |
| 2010/0070928 A1 | 3/2010 | Goodger et al. |
| 2010/0228733 A1 | 9/2010 | Harrison et al. |
| 2010/0313124 A1* | 12/2010 | Privault et al. ................ 715/702 |
| 2011/0161828 A1 | 6/2011 | Sauve et al. |
| 2011/0296038 A1* | 12/2011 | Mandre ........................ 709/228 |
| 2012/0131365 A1* | 5/2012 | Tabone et al. ................ 713/320 |

OTHER PUBLICATIONS

"Search Contents in Common Multi-Tabbed Browser", IBM Corporation, IPCOM000193019, Feb. 8, 2010, 2 pages.

"Tag Based Window and Tab Management System", IBM Corporation, IPCOM000201676, Nov. 18, 2010, 1 page.

Mossberg, Walter S., "Google Redefines Web Browser", Wall Street Journal, Sep. 2, 2008, 6 pages.

Viermetz, M. et al., "Relevance and Impact of Tabbed Browsing Behavior on Web Usage Mining", IEEE/WIC/ACM International Conference on Web Intelligence (WI2006), Dec. 18-22, 2006, Abstract only, 1 page.

* cited by examiner

DISPLAY OF HYPERTEXT DOCUMENTS GROUPED ACCORDING TO THEIR AFFINITY

BACKGROUND

The solution according to one or more embodiments of the present invention relates to the data processing field. More specifically, this solution relates to the access to hypertext documents.

Hypertext documents are commonly used to facilitate the access to information of various kinds. The example by antonomasia of application of the hypertext documents is the web in the Internet (wherein billion of web pages are linked one to another). In this way, a user may navigate (or surf) in the Internet by means of a browser, which allows retrieving, rendering and traversing the web pages.

A problem of the Internet is the difficulty in finding the actual information of interest among the huge amount of web pages that are available. For this purpose, the user generally accesses the web page of a search engine for retrieving a list of web pages that best match selected keywords. The user may then open the web pages that seem to be more promising (for example, as indicated by a corresponding summary or preview in the list) by clicking on corresponding hyperlinks. The user may then move forwards each opened web page through other hyperlinks.

Particularly, modern browsers generally have a Tabbed Document Interface (TDI), wherein multiple web pages may be opened in corresponding tabbed panes of a single window provided with corresponding tabs to switch among them. An example of tabbed browser is described in US-A-2006/0271858 (the entire disclosure of which is herein incorporated by reference). Moreover, US-A-2010/0070928 (the entire disclosure of which is herein incorporated by reference) discloses a technique for customizing a tab page for opening web pages associated with bookmarks. A further improvement is provided in the browser CHROME by GOOGLE Inc. (trademarks), wherein when a new web page is opened through a hyperlink from a source web page the tabbed pane of the new web page is arranged close to the tabbed pane of the source web page (rather than at the end of the row of tabbed panes). The "Tag Based Window and Tab Management System" document (the entire disclosure of which is herein incorporated by reference) also proposes tagging tabs and windows so as to allow grouping them for different applications (for example, to facilitate their closure).

A collaborative movement also exists that promotes the implementation of a so-called semantic web. This encourages the inclusion of semantic information in the web pages, in a standard format that should allow its use by machines. For this purpose, several techniques are available for classifying the web pages according to their topics—for example, as described in US-A-2010/0228733 (the entire disclosure of which is herein incorporated by reference).

Moreover, U.S. Pat. No. 7,747,626 (the entire disclosure of which is herein incorporated by reference) proposes clustering the result of the search returned by the search engine into different categories, and displaying them in separate tabbed panes. US-A-2008/0184158 (the entire disclosure of which is herein incorporated by reference) instead proposes a technique for identifying browser windows among all the windows that are opened, so as to bring the browser windows into view above the other windows. US-A-2011/0161828 (the entire disclosure of which is herein incorporated by reference) describes a technique for downloading a new web page into a corresponding tabbed pane in background, so that the user may continue working with another web page already opened. US-A-20100031166 (the entire disclosure of which is herein incorporated by reference) describes a technique for defining place-marks by the user to create relationships among different web pages, so as to build a new web application with aggregated content taken from different web pages. The "Search Contents in Common Multi-tabbed Browser" document (the entire disclosure of which is herein incorporated by reference) proposes a search function for selected keywords that is applied to multiple tabbed panes of a window.

In any case, the search of the desired information requires quite complex operations of browsing in the Internet. The browsing is substantially based on heuristic and opportunistic strategies, which strongly depend on the recognition of the required information by the user. As a result, it is very common that the user opens several instances of the browser in corresponding windows, each one with several tabbed panes for corresponding web pages. Moreover, it may happen that the same web page is opened more times or that several web pages with similar contents are opened over time.

This causes a proliferation of the web pages, especially when different searches are performed concurrently. Therefore, it is quite difficult to find the web pages actually relating to each search; this is particularly annoying for the user (which may spend significant time to identify a web page that was found beforehand and left opened somewhere, maybe in a different window). Moreover, when a specific search is not of interest any longer, its web pages have to be closed individually; however, this operation is quite time consuming (since it requires identifying and closing each one these web pages manually).

SUMMARY

In its general terms, the solution according to one or more embodiments of the present invention is based on the idea of grouping the hypertext documents according to their affinity.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for accessing hypertext documents, wherein selected documents are displayed in an arrangement corresponding to a grouping thereof based on an affinity indicator for each pair of selected documents (calculated according to a comparison between semantic information of their contents).

Another aspect of the solution according to an embodiment of the invention provides a computer program product for performing this method.

Another aspect of the solution according to an embodiment of the invention provides a corresponding system for performing this method.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
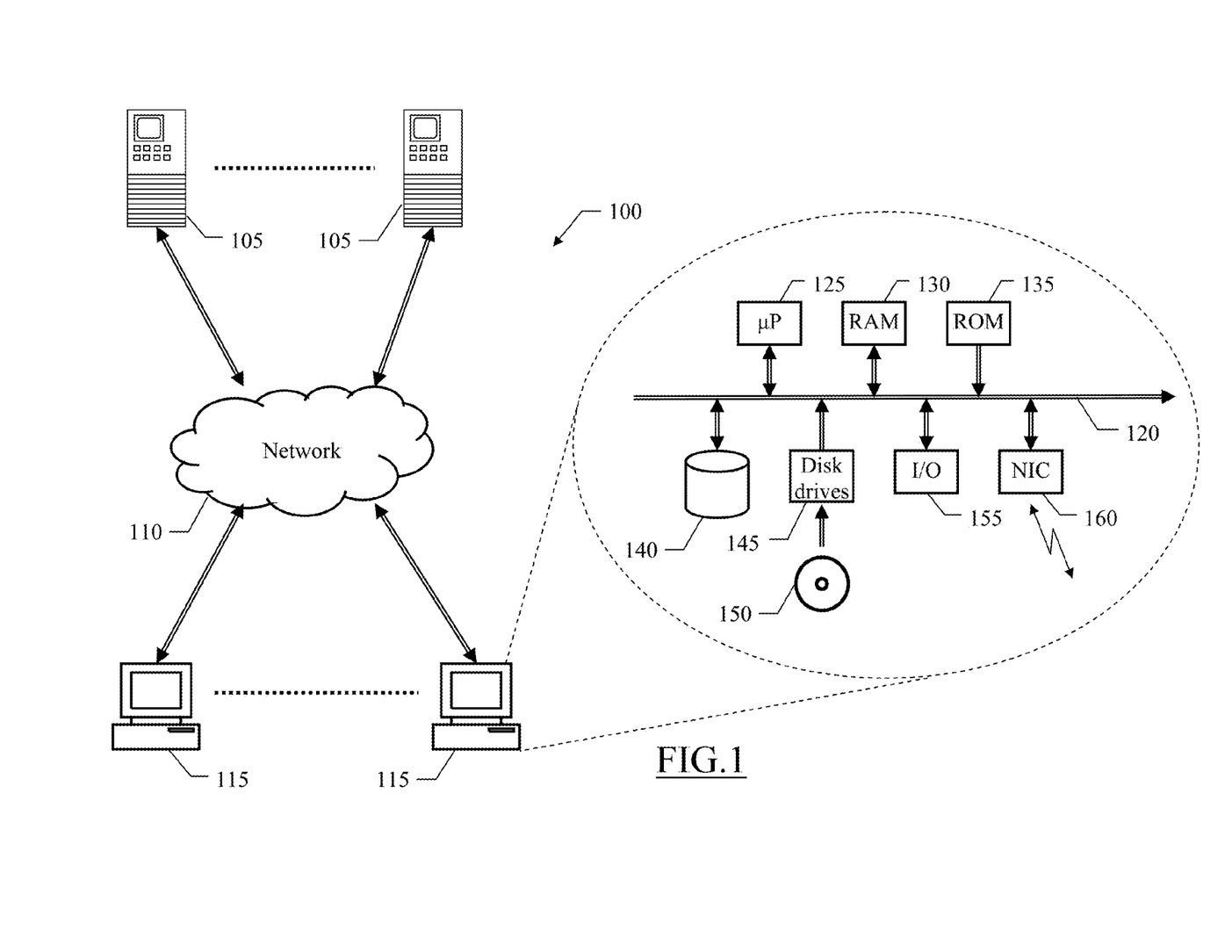
FIG. 1 shows a pictorial representation of a system wherein the solution according to an embodiment of the invention may be applied.

With reference in particular to FIG. 1, a pictorial representation is shown of a system 100 wherein the solution according to an embodiment of the invention may be applied.

The system 100 has a distributed architecture, typically based on the Internet; the Internet is formed by millions of server computers (or simply servers) 105, which are connected one to another through a global communication network 110. A subset of the servers 105, known as World Wide Web (www) or simply web, allows accessing corresponding web sites; each web site comprises a collection of web pages connected one to another starting from a home page. Each web page is defined by a hypertext document (formatted in the HTML language), which comprises one or more anchors (for example, text in underlined blue color or hand motif replacing a pointer) for corresponding hyperlinks; each hyperlink is a reference providing direct access to data in a distinct context, and particularly to another web page (either in the same web site or in a different one). The web pages are accessed through the HTTP protocol; for this purpose, each web page is identified and localized by means of a corresponding URL, which consists of a unique string formatted according to a standard syntax. Users of client computers (or simply clients) 115 access the Internet (through computers that operate as access providers, not shown in the FIG.), in order to download desired web pages from the servers 105.

A generic client 115 is formed by several units that are connected in parallel to one or more buses 120. In detail, one or more microprocessors (µP) 125 control operation of the client 115, a RAM 130 is used as a working memory by the microprocessors 125, and a ROM 135 stores basic code for a bootstrap of the client 115. The client 115 further comprises a mass memory with one or more hard disks 140 and disk drives 145 for reading/writing optical disks 150 (for example, CDs or DVDs), and input/output (I/O) units 155 (for example, a keyboard, a mouse, a monitor and USB ports). A network interface card (NIC) 160 is used to connect the client 115 to the network 110.

Figure 2:
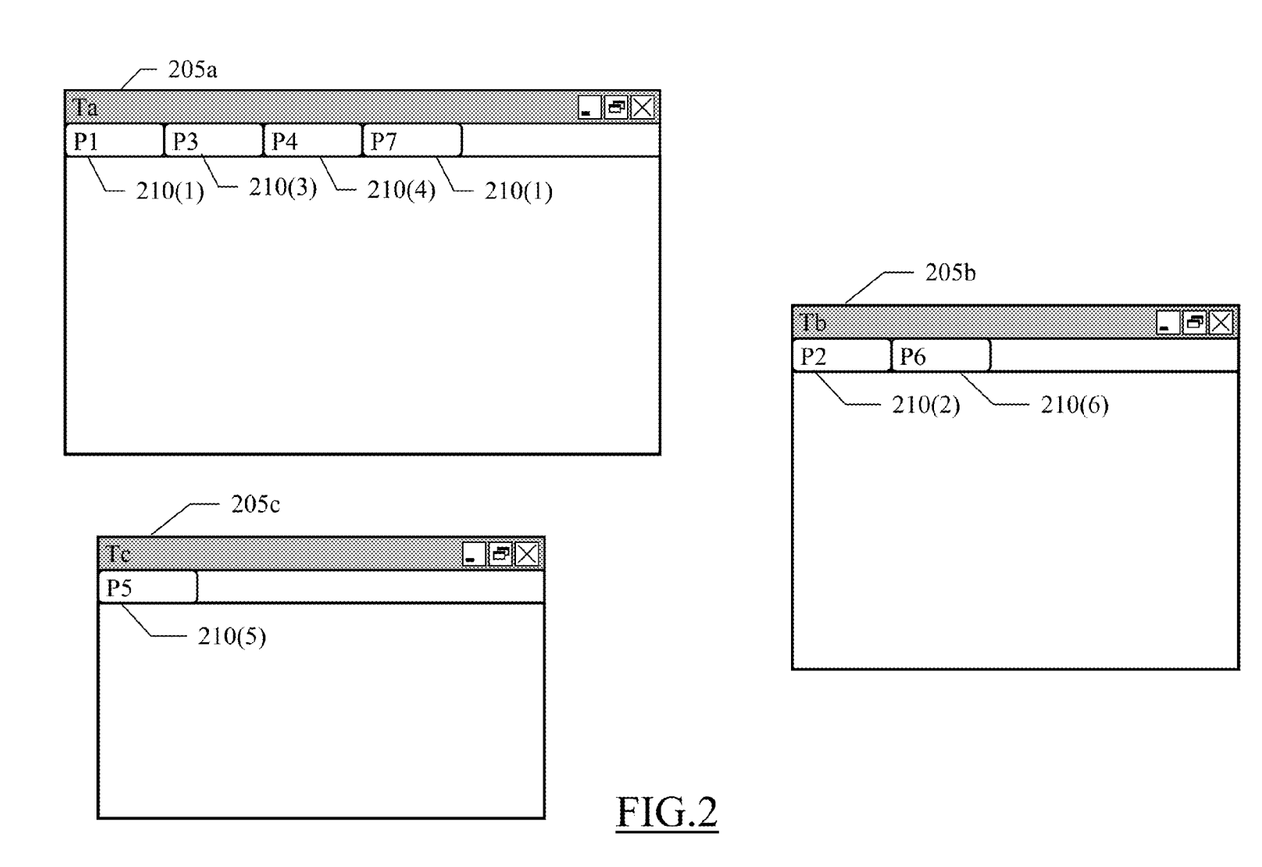
FIG. 2 shows an example of application of the solution according to an embodiment of the invention.

An example of application of the solution according to an embodiment of the invention is shown in the FIG. 2.

The user of each client navigates in the Internet as usual; for this purpose, the user may open several web pages, and s/he may move from a web page to another by clicking on the anchor of the corresponding hyperlink. A typical scenario is a search for information about a specific topic. For this purpose, the user may open the web pages of one ore more search engines. The user then starts searching the desired information with each search engine through corresponding keywords; the search engine returns a list of web pages that best match these keywords. The user may then open the web pages that seem to be more promising and then move forwards each web page through other hyperlinks (in the same tabbed pane of a source web page by replacing it, in a new tabbed pane of the same window of the source web page, or in a different window). The same operations are typically reiterated, moving forwards and backwards through the opened web pages. Any web pages that may be of interest are generally left opened for next reference in the corresponding tabbed panes.

In the solution according to an embodiment of the invention, an affinity indicator is calculated for each pair of web pages, or more generally hypertext documents, that are opened (according to a comparison between semantic information of a content of each web page of the pair); the web pages are then grouped into a set of groups (by assigning each web page to at least one of the groups according to the affinity indicators). The web pages are then displayed in an arrangement corresponding to their grouping.

For example, in the case at issue seven web pages P1, P2, P3, P4, P5, P6 and P7 are opened. The pages P1, P3, P4 and P7 relate to a common topic Ta, the pages P2 and P6 relate to a common topic Tb, whereas the page P5 relates to a different topic Tc. Therefore, in this case the pages P1-P7 are grouped into a group {P1,P3,P4,P7} for the topic Ta, a group {P2,P6} for the topic Tb, and a group {P5} for the topic Tc.

The above-described solution categorizes the web pages in a logical way according to their content. This facilitates the finding of any desired piece of information among the web pages (for example, relating to a specific topic of interest), even when these web pages have been opened at different points in time. Likewise, this facilitates the closing of the web pages relating to a topic that is not of interest any longer. All of the above provides a significant time saving, thereby making the browsing in the Internet far more efficient.

Particularly, in the specific embodiment shown in the figure, a different window (on a desktop of a GUI of the client) is assigned to each group—i.e., a window 205a for the group {P1,P3,P4,P7}, a window 205b for the group {P2,P6}, and a window 205c for the group {P5}; preferably, a title bar of each window 205a-205c comprises a descriptive label of the corresponding topic (i.e., Ta for the window 205a, Tb for the window 205b and Tc for the window 205c). Within each window 205a-205c, each corresponding web page is displayed in a different tabbed pane—i.e., four tabbed panes 210(1), 210(3), 210(4) and 210(7) for the web pages P1, P2, P4 and P7, respectively, in the window 210a, two tabbed panes 210(2) and 210(6) for the web pages P2 and P6, respectively, in the window 210b, and a single tabbed pane 210(5) for the web page P5 in the window 210c.

In this way, the user may easily identify the window relating to any desired topic by means of its title bar, with all the web pages relating to this topic that are close together in the tabbed panes of this window.

Figure 3:
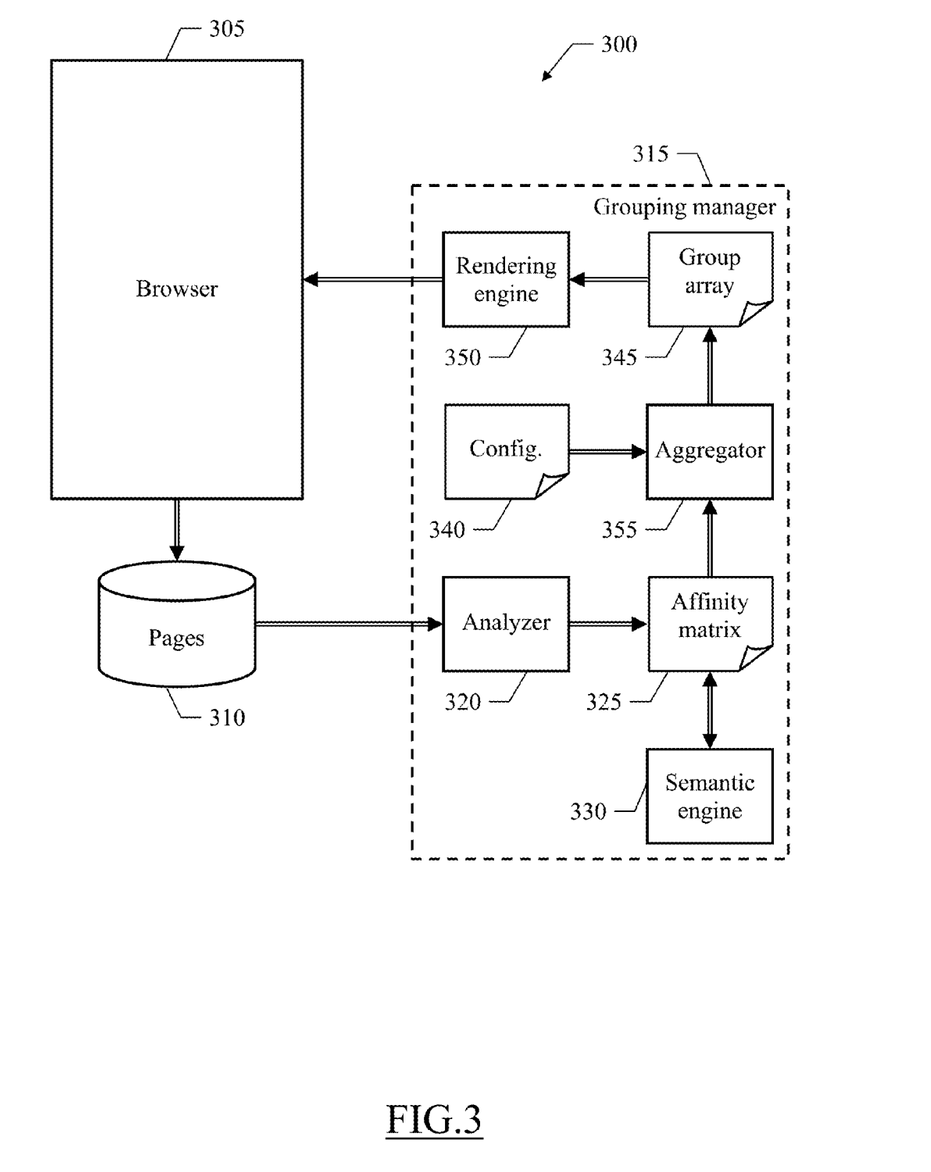
FIG. 3 shows the main software components that may be used to implement the solution according to an embodiment of the invention.

The main software components that may be used to implement the solution according to an embodiment of the invention are shown in the FIG. 3.

These software components are denoted as a whole with the reference 300. The information (programs and data) is typically stored in the hard disk and loaded (at least partially) into the working memory of a generic client when the programs are running, together with an operating system and other application programs (not shown in the FIG.). The programs are initially installed onto the hard disk, for example, from optical disks.

Particularly, a browser 305 is exploited by a user of the client to navigate in the Internet. Particularly, the browser 305 makes it possible to locate desired web pages (through their URLs), and then download their HTML specifications onto the client 115 for their display; moreover, the browser 305 allows the user to move quickly to other web pages by means of corresponding hyperlinks. For each desired web page, the browser 305 submits a corresponding request to the respective server (not shown in the FIG.), as indicated in its URL. Once the web page has been received onto the client, it is saved into a cache memory 310 of the browser 305.

The browser 305 interacts with a grouping manager 315 (for example, a plug-in thereof) for implementing the above-described solution. More specifically, an analyzer 320 accesses the cache memory 310 to extract semantic information of the web pages stored therein. The semantic information of each web page describes the meaning of its content in a formal way; this is based on an ontology, and more specifically on a taxonomy that assigns the web page to one or more topics (each one representing a semantic concept). Typically, the taxonomy has a hierarchical structure, wherein the topics are organized into one or more trees (possibly overlapped), with child topics that are comprised in parent topics up to a root topic of each tree (for example, the topic animals that comprises the topics dogs and cats). The semantic information may be comprised in HTML meta-data tags of the web page (used to implement a semantic web allowing automatic processing of the corresponding information). For example, the semantic information may be specified according to the Resource Description Framework (RDF). The RDF allows making statements about subjects representing specific resources in the form of subject-predicate-object expressions (known as triples). In this specific case, the subject is the web page, the predicate denotes a relationship is-a, and the object denotes a topic; the topic may be defined by a literal or a Uniform Resource Identifier (URI) of a controlled vocabulary (for example, in the DBpedia). The RDF triples of the web page intrinsically represents a graph (called RDF graph), which is serialized into a format suitable to its representation in the web page (for example, XML or N3).

The analyzer 320 controls an affinity matrix that is stored in a corresponding table (both denoted with the reference 325). The affinity matrix 325 is a square matrix with a same number of rows and columns equal to a number of the web pages that are currently opened. The analyzer 320 saves the semantic information of each (opened) web page into a corresponding cell of the main diagonal of the affinity matrix 325 (i.e., the cell in the row and column of the web page).

A semantic engine 330 (for example, exploiting a corresponding web service) accesses the table of the affinity matrix 325. For each pair of different web pages in the affinity matrix 325, the semantic engine 330 calculates an affinity index measuring a semantic affinity between their content (for example, spanning from 0% for no affinity to 100% for complete affinity). The affinity index of each pair of web pages is calculated according to a comparison between their semantic information. Several correlation techniques are known in the art for calculating the semantic affinity between two topics (for example, as described in the above-mentioned document US-A-0228733). Briefly, for each pair of web pages the affinity index may be set to 0% when the web pages do not have any topic in common in the taxonomy tree and to 100% when they relate exactly to the same topic; when the web pages relate to different topics with a common parent topic in the taxonomy tree, the affinity index is set according to a distance between their topics (for example, calculated from the number of all the web pages in the Internet belonging to only one of the two topics and to both of them). The semantic engine 330 saves the affinity index of each pair of web pages, together with the name of the lowest common topic in the taxonomy tree, in a corresponding cell of the affinity matrix 325 (for example, only in its upper part to avoid any duplication of information).

An aggregator 335 accesses the table of the affinity matrix 325. The aggregator 335 groups the web pages into a set of groups according to their affinity indexes. For this purpose, the aggregator 335 further accesses a table storing configuration information (both denoted with the reference 340); particularly, the configuration information 340 comprises a value indicating the maximum allowable number of groups (maximum group number $MAXg>1$, for example, 3-5), a value indicating the maximum allowable number of web pages in every group (maximum item number $MAXi>1$, for example, 3-10), and a value defining a minimum threshold for the affinity indexes of the web pages in the same group (affinity threshold $THa>0\%$, for example, 30-70%). Several clustering techniques are known in the art for grouping the web pages (for example, as described again in the above-mentioned document US-A-0228733). Briefly, a bottom-up approach is used, wherein each web page is initially assigned to a different group (with the corresponding affinity indexes and common topics); the two groups with the highest affinity index are merged into a new group (by calculating the affinity index between the new group and each other group, and determining the corresponding lowest common topic). The process is reiterated until the number of groups (each one comprising a number of web pages at most equal to the maximum item number MAXi) reaches the maximum group number MAXg, with all the affinity indexes lower than the affinity threshold THa. The aggregator 335 creates a group array defining these groups (i.e., the web pages and the common topic of each one of them), which group array is saved into a corresponding table (both denoted with the reference 345).

A rendering engine 350 accesses the table of the group array 345. The rendering engine 350 instructs the browser 305 to display the web pages in an arrangement corresponding to their grouping. For example, the web pages of each group are displayed in a corresponding window; in turn, the web pages of the group are displayed in corresponding tabbed panes of their window. Preferably, the name of the common topic of each group is displayed in the title bar of the corresponding window.

Figure 4A:
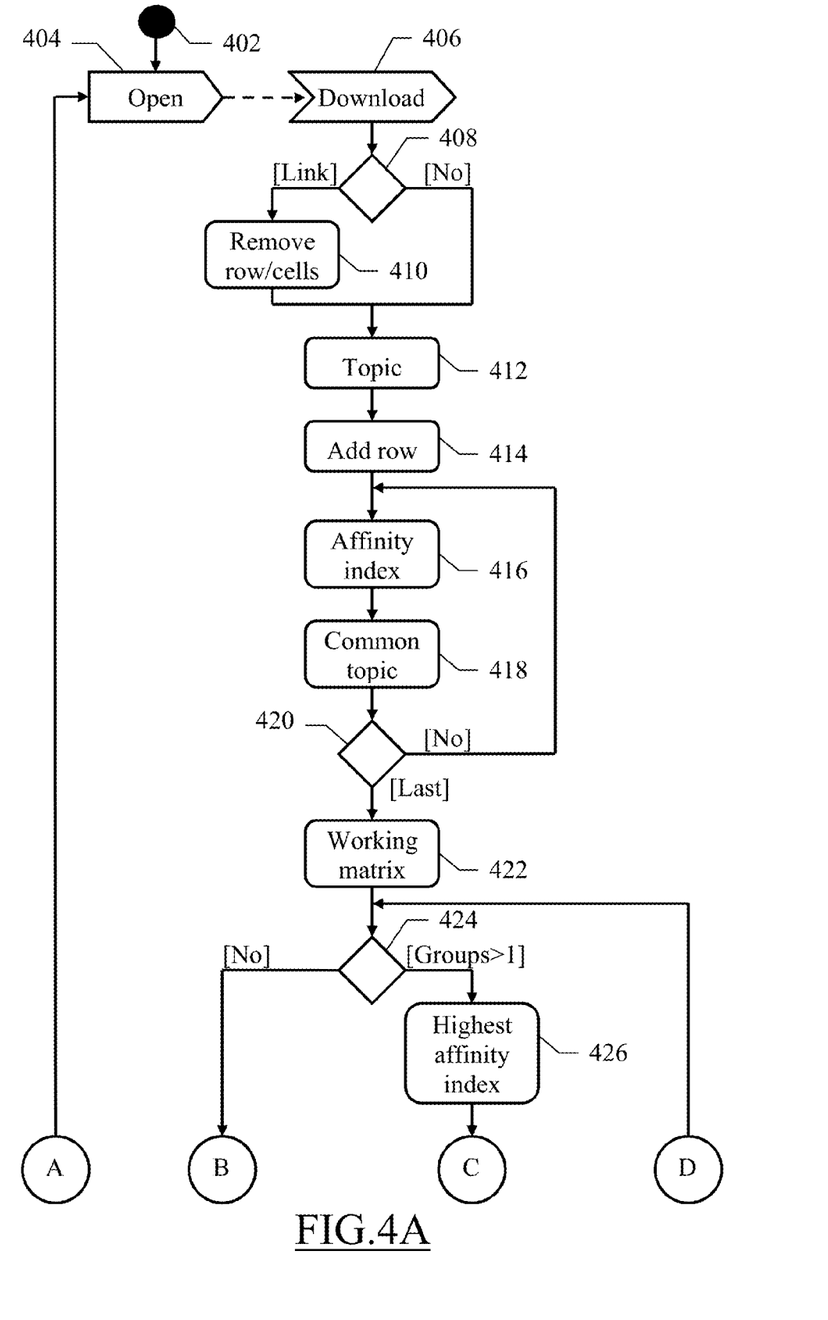
FIG. 4A-FIG. 4C show an activity diagram describing the flow of activities relating to an implementation of the solution according to an embodiment of the invention.
Figure 4B:
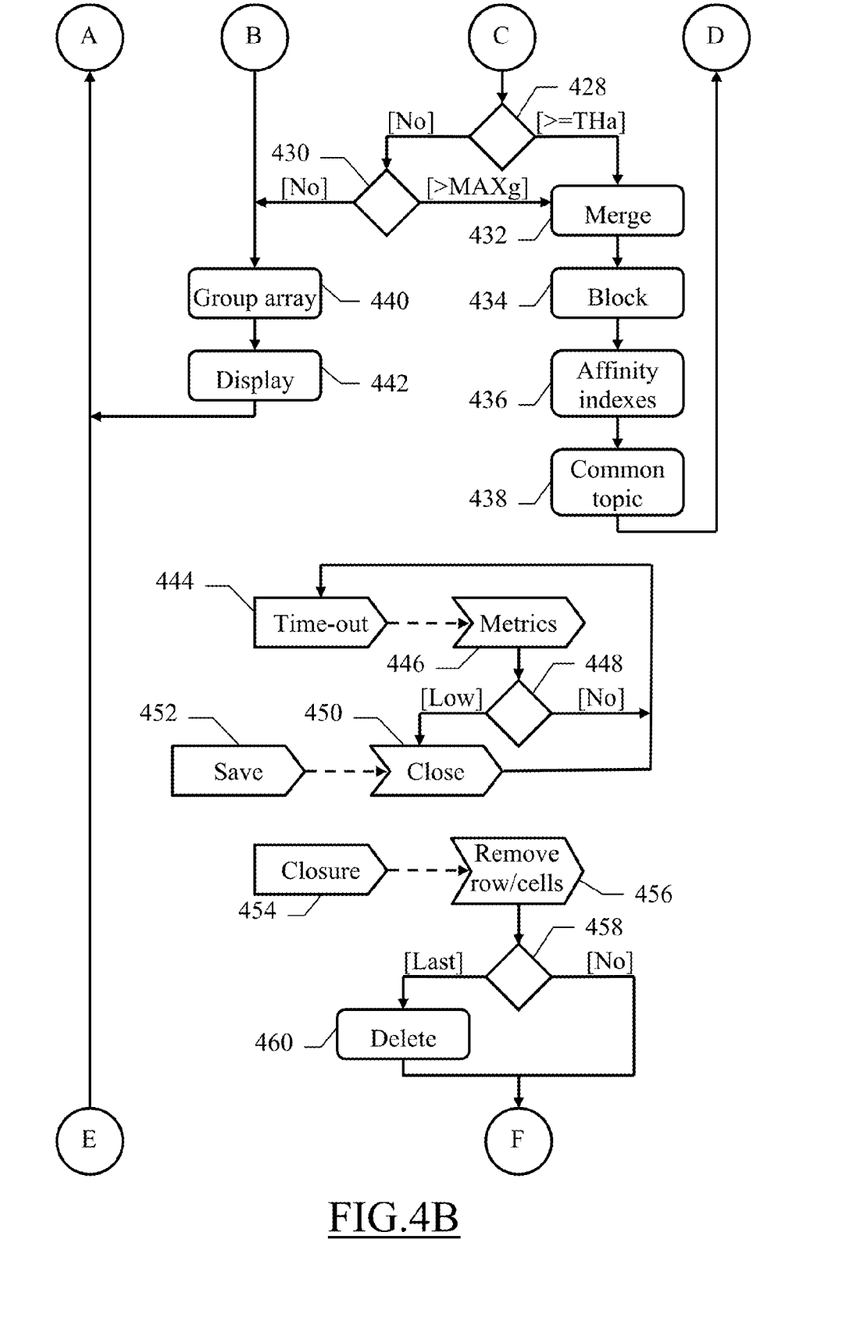
Figure 4C:
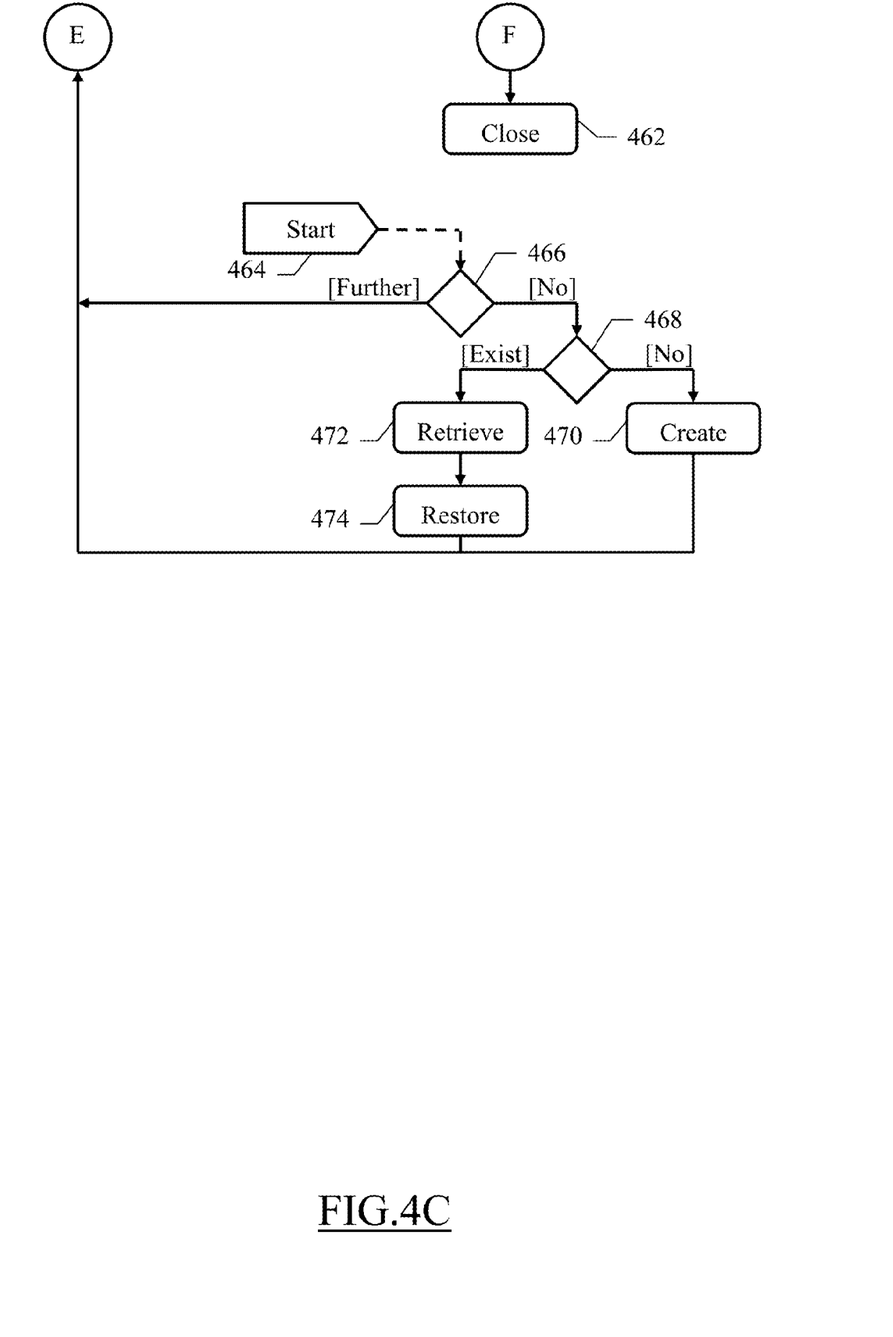

With reference now to the FIG. 4A-FIG. 4C, an activity diagram is shown describing the flow of activities relating to an implementation of the solution according to an embodiment of the invention. In this respect, each block in the diagram may represent a module, segment or portion of code, which comprises one or more executable instructions for implementing the specified logical function (or more).

The method begins at the black start circle 402, and then passes to block 404 as soon a command for opening a new web page is submitted by the user of a generic client, by either typing its URL (in a navigation bar of a window of the browser currently displaying a source web page in a tabbed pane thereof) or clicking on the anchor of a corresponding hyperlink in a source web page (displayed in a tabbed pane of the window of the browser). In response thereto, the HTML definition of the new web page is downloaded at block 406 (from the corresponding server onto the client). The flow of activity branches at block 408 according to how the new web page has been reached. Particularly, if the new web page replaces the source web page (when it has been reached through the corresponding URL or hyperlink causing its opening in the same tabbed pane of the source web page), the method descends into block 410; in this phase, the row of the source web page is removed from the affinity matrix, together with the corresponding cells in its other rows. The flow of activity then merges again at block 412, either from the block 410 or directly from the block 408 (when the new web page has been reached through the corresponding hyperlink but causing its opening in a new tabbed pane or window without removing the source web page); in both cases, the topic (or topics) of the new web page is extracted from the RDF graph comprised in its HTML definition. Continuing to block 414, a new row for the new web page is added to the affinity matrix, and its topic is stored into the corresponding cell of its main diagonal.

A loop is now performed for each pair of web pages that are currently opened, as identified by the cells of the upper part of the affinity matrix (different from its main diagonal). The loop begins at block 416, wherein the affinity index of a current pair of web pages (starting from the first one along the affinity matrix) is calculated and stored into the corresponding cell of the affinity matrix. Continuing to block 418, the lowest common topic in the taxonomy tree between the web pages of the pair is determined and stored in the same cell of the affinity matrix. A test is performed at block 420 to verify whether a last pair of web pages has been processed (i.e., whether the whole affinity matrix has been scanned). If not, the method returns to the block 416 to repeat the same operations for a next pair of web pages.

As soon as all the pairs of web pages have been processed, the loop is exit by descending from the block 420 into block 422. In this phase, a working matrix is initialized by copying the affinity matrix; an identifier of each web page is also added to the corresponding cell in the main diagonal of the working matrix, to indicate the composition of a corresponding group (initially formed only by the web page of the row). A test is then made at block 424 to verify whether the number of groups that may be merged (as indicated by the corresponding affinity indexes in the working matrix, see below) is higher than one. If so, the highest affinity index in the working matrix is determined at block 426 (choosing the first one in case or two or more equal values). The highest affinity index is compared with the affinity threshold THa at block 428. If the highest affinity index is lower than the affinity threshold THa, the number of groups (as indicated by the number of rows in the working matrix) is compared with the maximum group number MAXg at block 430. If the number of groups is higher than the maximum group number MAXg, the (old) groups corresponding to the highest affinity index are merged into a new group at block 432; the same point is also reached from the block 428 if the highest affinity index is higher than or equal to the affinity threshold THa. For this purpose, the rows of the old groups are removed from the working matrix (after saving their content into a temporary variable), together with the corresponding cells in the other rows; a new row for the new group is then added to the working matrix, and the composition of the new group (i.e., the union of the web pages of the two old groups) is stored into the corresponding cell of its main diagonal. Passing to block 434, each new pair of groups (being formed by the new group with each one of the other groups) is verified against the maximum item number MAXi; particularly, if the sum of the corresponding web pages is higher than the maximum item number MAXi the new pair of groups is blocked to prevent the merging thereof (for example, by storing a blocking flag in the corresponding cell of the new row). The method continues to block 436, wherein for each new pair of groups that is not blocked a new affinity index is calculated according to the corresponding affinity indexes of the old groups; each new affinity index is stored into the corresponding cell of the new row. With reference to block 438, the lowest common topic in the taxonomy tree between the topics of the two old groups is determined and stored into the same cell. The flow of activity then returns to block 424 to repeat the same operations described above.

Referring back to the block 424, if the groups that may be merged is lower than two, the method descends into block 440; the same point is also reached from the block 430 if the number of groups is lower than or equal to the maximum group number MAXg (and the highest affinity index is lower than the affinity threshold THa). In both cases, the merging of the groups is stopped; the definitions of the groups that remained in the working matrix (i.e., the web pages and the common topic of each one of them, as indicated in the corresponding cell of the main diagonal of the working matrix) are saved into the group array. The web pages are then displayed at block 442 according to their grouping. Particularly, a window is opened for each group (if necessary), and the name of its common topic is added to the corresponding title bar; for each web page of the group, a tabbed pane is opened (if necessary) in this window, and the web page is displayed therein. The method then returns to the block 404 waiting for the opening of another new web page.

In a completely asynchronous way, the method passes from block 444 to 446 as soon as a predefined time-out expires (for example, every 1-5 sec); in this phase, one or more performance metrics of the client are retrieved (for example, its processing power and working memory usage). These performance metrics are compared with predefined thresholds at block 448. If the result of this comparison indicates that the performance of the client is acceptable, the method returns to the block 444 waiting for a next expiration of the time-out. Conversely, when the result of the same comparison indicates that the performance of the client is too low, the method descends from the block 448 into block 450. The same point is also reached from block 452 when the user of the client enters a session saving command—for example, when the browser or the whole client have to be shutdown following a management operation requiring a re-starting thereof (such as the installation of a patch or of a new version of the browser). In any case, all the windows displaying the groups of web pages are closed but without affecting the group array; in this way, a corresponding working session defined by the groups of web pages is automatically saved (see below); as above, the method then returns to the block 444 waiting for a next expiration of the time-out.

Alternatively, the method passes from block 454 to 456 as soon as the user enters a closing command in the window displaying a selected group of web pages. In this phase, the corresponding entry is removed from the group array; at the same time, the row of each web page of the selected group and the corresponding cells in the rows of the other web pages are removed from the affinity matrix. A test is then made at block 458 to verify whether the selected group of web pages was the last one (as indicated in the group array). If so, the group array and the affinity matrix are deleted at block 460 (so as to terminate the corresponding working session). The flow of activity then descends into block 462; the same point is also reached directly from the block 458 when further groups of web pages have remained. In both cases, the window displaying the selected group of web pages is closed.

In a completely asynchronous way, the method passes from block 464 to 466 as soon as the user starts the browser; in this phase, a test is made to verify whether further instances of the browser are already running. If so, the method returns to the block 404 waiting for the opening of another new web page (and particularly the web page opened by default in the window of the browser at its starting). Conversely (when this is the first instance of the browser that is started), a further test is made at block 468 to verify whether both the affinity matrix and the group array already exist. If not (i.e., at least one of them is missing), meaning that a previous working session was correctly terminated (or at most a crash of the browser or of the whole client occurred after one of them had already been deleted), the affinity matrix and the group array are created (initially empty) at block 470. Conversely, meaning that the corresponding working session has been saved automatically in response to the detection of the low performance condition or manually by submitting the session saving command (or a crash occurred during the previous working session, so that it was closed without deleting neither the affinity matrix nor the group array), the group array is retrieved at block 472. Continuing to block 474, a window is opened for each group, and the name of its common topic is added to the corresponding title bar; for each web page of the group, a tabbed pane is opened in this window, and the web page is displayed therein. In this way, the previous working session is restored exactly as before its termination; as a result, the user retrieves the web pages that have been opened beforehand organized exactly in the same logical way. In both cases, the method returns to the block 404 (from either the block 470 or the block 474) waiting for the opening of a further new web page.

For example, the above-described algorithm may be applied to five web pages P1, P2, P3, P4 and P5; the web page P1 relates to animals, more specifically to pets and still more specifically to dogs ( . . . /animals/pets/dogs), the web page P2 relates to animals, more specifically to pets and still more specifically to cats ( . . . /animals/pets/cats), the web page P3 relates to animals and more specifically to fodder ( . . . /animals/fodder), the web page P4 relates to geography and more specifically to flags ( . . . /geography/flags), and the web page P5 relates to geography and more specifically to countries ( . . . /geography/countries). A possible affinity matrix (with the affinity indexes between each pair of these web pages) may be:

|    | P1 | P2 | P3 | P4 | P5 |
|----|----|----|----|----|----|
| P1 | . . . /animals/pets/dogs | 70% | 20% | 0% | 0% |
| P2 |    | . . . /animals/pets/cats | 20% | 0% | 0% |
| P3 |    |    | . . . /animals/fodder | 0% | 0% |
| P4 |    |    |    | . . . /geography/flags | 80% |
| P5 |    |    |    |    | . . . /geography/countries |

Assuming that the maximum group number is MAXg=2, the maximum item number is MAXi=5 and the affinity threshold is THa=40%, at first the group {P4} and the group {P5} are merged into a new group {P4,P5} relating more generally to geography ( . . . /geography), as indicated in the resulting working matrix:

|    | P1 | P2 | P3 | {P4, P5} |
|----|----|----|----|----------|
| P1 | . . . /animals/pets/dogs {P1} | 70% | 20% | 0% |
| P2 |    | . . . /animals/pets/cats {P2} | 20% | 0% |
| P3 |    |    | . . . /animals/fodder {P3} | 0% |
| {P4, P5} |    |    |    | . . . /geography {P4, P5} |

Likewise, the group {P1} and the group {P2} are merged into a new group {P1,P2} relating more generally to pets ( . . . /animals/pets), as indicated in the resulting working matrix:

|    | {P1, P2} | P3 | {P4, P5} |
|----|----------|----|----------|
| {P1, P2} | . . . /animals/pets {P1, P2} | 30% | 0% |
| P3 |    | . . . /animals/fodder {P3} | 0% |
| {P4, P5} |    |    | . . . /geography {P4, P5} |

Since the number of groups (3) is still higher than the maximum group number MAXg=2, the group {P1,P2} and the group {P3} are merged into a new group relating more generally to animals ( . . . /animals), even if their affinity index (30%) is lower than the affinity threshold THa=40%, as indicated in the resulting working matrix:

|            | {P1, P2, P3}              | {P4, P5}              |
|------------|--------------------------|-----------------------|
| {P1, P2, P3} | .../animals<br>{P1, P2, P3} | 0%                  |
| {P4, P5}   |                          | .../geography<br>{P4, P5} |

At this point, a window (with its tool bar indicating the common topic animals) is opened for the group {P1,P2,P3} and another window (with its tool bar indicating the common topic geography) is opened for the group {P4,P5}—with the web pages of each group that are displayed in corresponding tabbed panes of its window.

If later on the window of the group {P4,P5} is closed, the affinity matrix becomes:

|    | P1                  | P2                  | P3                   |
|----|---------------------|---------------------|----------------------|
| P1 | .../animals/pets/dogs | 70%               | 20%                  |
| P2 |                     | .../animals/pets/cats | 20%                |
| P3 |                     |                     | .../animals/fodder   |

Therefore, the group {P1} and the group of {P2} are again merged into a new group {P1,P2} relating more generally to pets (.../animals/pets), as indicated in the resulting working matrix:

|         | {P1, P2}         | P3                  |
|---------|------------------|---------------------|
| {P1, P2} | .../animals/pets | 30%                 |
| P3      |                  | .../animals/fodder  |

However, the merging is now stopped, since no affinity index exceeds the affinity threshold THa and the maximum group number MAXg has already been reached. Therefore, a window (with its tool bar indicating the common topic animals/pets) is opened for the group {P1,P2} and another window (with its tool bar indicating the common topic animals/fodder) is opened for the group {P3}—with the web pages of each group that are displayed in corresponding tabbed panes of its window.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the present invention provides a method for accessing hypertext documents on a data processing system. The method comprises the following steps. A plurality of selected documents is opened. An affinity indicator is calculated for each pair of selected documents according to a comparison between semantic information of a content of each selected document of the pair. The selected documents are grouped into a set of groups by assigning each selected document to at least one of the groups according to the affinity indicators. The selected documents are then displayed in an arrangement corresponding to the grouping thereof.

However, the same solution may be applied to any number and type of hypertext documents, and in any data processing system (see below). The affinity between each pair of selected documents may be defined by any indicator (for example, by multiple indexes). Moreover, the affinity indicator may be calculated in any way from the semantic information, the selected documents may be grouped in any way, and they may be displayed according to their grouping in any way (see below).

In an embodiment of the invention, the hypertext documents are web pages.

However, the hypertext documents may be of any other type, even outside the Internet realm (for example, sections of a hypertext book).

In an embodiment of the invention, the step of calculating an affinity indicator for each pair of selected documents comprises extracting the semantic information of each selected document from the selected document.

However, the semantic information of each selected document may be defined in any way—for example, in the Web Ontology Language (OWL). In any case, the semantic information may also be calculated at run-time directly from the content of the selected document by a suitable semantic engine.

In an embodiment of the invention, the step of grouping the selected documents into a set of groups comprises grouping the selected documents according to an affinity threshold for the affinity indicators.

However, the affinity threshold may have any value (even customizable by the user or varying automatically, for example, according to the performance of the client). In any case, the grouping of the selected documents may be implemented with any other technique, even without any affinity threshold (for example, based on fuzzy logic).

In an embodiment of the invention, the step of grouping the selected documents into a set of groups comprises grouping the selected documents by maintaining a number of the groups within a maximum group number.

However, the maximum group number may have any value (even customizable or varying automatically). In any case, a simplified implementation without this constraint is not excluded.

In an embodiment of the invention, the step of grouping the selected documents into a set of groups comprises grouping the selected documents by maintaining a number of the selected documents assigned to each group within a maximum item number.

However, the maximum item number may have any value (even customizable or varying automatically). In any case, a simplified implementation without this constraint is not excluded.

In an embodiment of the invention, the step of grouping the selected documents into a set of groups comprises initializing the groups by assigning each selected document to a different group and setting the affinity indicator for each pair of groups accordingly. The following steps are then repeated. A pair of old groups with the highest affinity indicator is determined. The old groups are merged into a new group. Each new pair of groups between the new group and each other group is blocked to prevent the merging thereof when a sum of the corresponding selected documents exceeds the maximum item number. The affinity indicator for each new pair of groups is calculated according to the affinity indicators between the old groups and the corresponding other group. These steps are repeated until the highest affinity indicator is lower than the affinity threshold and the number of the groups is lower than or equal to the maximum group number.

However, the selected documents may be grouped with any other algorithm (for example, with a top-down approach); moreover, the groups may be disjoint (as described above) or even partially overlapping (with a same selected document that may be replicated in two or more groups).

In an embodiment of the invention, the step of displaying the selected documents comprises displaying the selected documents of each group in a corresponding window; each selected document of the group is then displayed in a corresponding tabbed pane of the window.

However, the pages may be displayed in any other arrangement corresponding to their grouping (for example, with the pages of each group in different frames of a corresponding window, or with the pages of each group in corresponding windows that are stacked one to another).

In an embodiment of the invention, the step of grouping the selected documents into a set of groups comprises determining a common topic of the selected documents of each group according to a comparison between the semantic information of each selected document of the group; moreover, the step of displaying the selected documents comprises displaying an indication of the corresponding common topic for each group.

However, the common topic of each group may be determined in any way (for example, from a semantic analysis of the corresponding web pages); in any case, any other information may be displayed for each group (for example, simply a title of the most representative web page thereof), down to none.

In an embodiment of the invention, the steps of calculating an affinity indicator for each pair of selected documents, grouping the selected documents into a set of groups and displaying the selected documents in an arrangement corresponding to the grouping thereof are performed in response to each event affecting the content of at least one of the selected documents.

However, this step may be performed at any other time (for example, in addition to when a new document is opened, also when a document is reloaded or when the content of a document changes).

In an embodiment of the invention, the method further comprises the following steps. An indication of the grouping of the selected documents is saved. The selected documents are closed. The indication of the grouping of the selected documents is retrieved. The selected documents are re-opened by displaying the selected documents in the arrangement corresponding to the grouping thereof.

However, the grouping of the selected documents may be saved in any way (for example, by copying the group array in a dedicated structure, for example, a temporary favorite directory). In any case, the grouping of the selected documents may also be saved for other purposes (for example, to update a favorite list by adding a new folder for a selected group containing a pointer to each one of the corresponding documents), or vice-versa no saving at all of the grouping may be supported.

In an embodiment of the invention, the method further comprises the steps of monitoring at least one performance metric of the data processing system; the steps of saving an indication of the grouping of the selected documents and closing the selected documents are performed in response to a detection of a low performance condition according to said at least one metric.

However, any metrics (for example, a mass memory usage) may be monitored with any timing; moreover, the metrics may be used in any way to determine the low performance condition (for example, according to rules based on comparisons with multiple threshold values).

In an embodiment of the invention, the method further comprises the step of submitting a session saving command; the steps of saving an indication of the grouping of the selected documents and closing the selected documents are performed in response to the session saving command.

However, the session saving command may be entered in any way (for example, implicitly when all the windows of the selected documents are closed together). In any case, the grouping may be saved in response to additional or alternative events (for example, in response to the low performance condition only, to the session saving command only, or to the opening of too many documents), or this feature may be omitted at all.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the present invention provides a computer program, which comprises code means for causing a data processing system to perform the steps of the above-mentioned method when the computer program is executed on the data processing system.

Another embodiment of the present invention provides a computer program product, which comprises a non-transitory computer readable medium embodying a computer program; the computer program comprises code means directly loadable into a working memory of a data processing system thereby configuring the data processing system to perform the same method.

However, the same method may be implemented in any way (for example, as a stand-alone module, as a plug-in for the browser, or directly in the browser itself); it would be readily apparent that it is also possible to deploy the same solution (or at least part thereof) as a service that is accessed through a network (such as in the Internet).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the present invention provides a data processing system, which comprises means configured for performing the steps of the above-mentioned method.

However, the same method may also be carried out on a system based on a different architecture (for example, a local, wide area, global, cellular or satellite network), and exploiting any type of (wired and/or wireless) connections. However, its implementation on a stand-alone computer is not excluded. In any case, each computer may have another structure or may comprise similar elements (such as cache memories temporarily storing the programs or parts thereof); moreover, it is possible to replace the computer with any code execution entity, either based on a physical machine or a virtual machine (such as a PDA, a mobile phone, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:
1. A method for accessing hypertext documents on a data processing system, the method comprising the steps of:
opening a plurality of selected hypertext documents,
creating an affinity matrix for each of the selected hypertext documents,
calculating an affinity indicator for each pair of selected hypertext documents in the affinity matrix according to a comparison between semantic information of a content of each selected hypertext document of the pair,
grouping the selected hypertext documents into a set of groups by assigning each selected hypertext document to at least one group in the set of groups according to the affinity indicators, wherein a number of selected hypertext documents in each group of the set of groups is limited to a predetermined number of selected hypertext documents and wherein grouping the selected hypertext documents into the set of groups comprises:
grouping the selected hypertext documents into a particular group up to the predetermined number of selected hypertext documents by:

initializing the set of groups by assigning each single hypertext document to its own group and setting an affinity index for each group accordingly, and repeating the steps of:
determining a pair of initialized groups with highest affinity indexes,
merging the pair of initialized groups into a new group,
for each new pair of groups, calculating a sum of the corresponding selected hypertext documents within the group,
determining whether the sum of the corresponding selected hypertext documents exceeds the predetermined number of selected hypertext documents,
blocking each new pair of groups between the new group and each other group to prevent the merging thereof when the sum of the corresponding selected hypertext documents exceeds the predetermined number of selected hypertext documents, and
calculating the affinity index for each new group according to the affinity index between the initialized groups and the corresponding other group, until the highest affinity index is lower than the affinity threshold and the number of the groups is lower than or equal to a predetermined number of groups, and
displaying the selected hypertext documents in an arrangement corresponding to the grouping thereof.

2. The method according to claim 1, wherein the selected hypertext documents are web pages.

3. The method according to claim 1, wherein calculating the affinity indicator for each pair of selected hypertext documents comprises:
extracting the semantic information of each selected hypertext document from the selected hypertext document.

4. The method according to claim 1, wherein grouping the selected hypertext documents into the set of groups comprises:
grouping the selected hypertext documents according to an affinity threshold for the affinity indicators.

5. The method according to claim 1, wherein groups in the sets of groups is limited to the predetermined number of groups and wherein grouping the selected hypertext documents into the set of groups comprises:
grouping the selected hypertext documents into the predetermined number of groups.

6. The method according to claim 1, wherein displaying the selected hypertext documents comprises:
displaying the selected hypertext documents of each group in a corresponding window, each selected hypertext document of the group being displayed in a corresponding tabbed pane of the window.

7. The method according to claim 1, wherein grouping the selected hypertext documents into the set of groups comprises:
determining a common topic of the selected hypertext documents of each group according to a comparison between the semantic information of each selected hypertext document of the group, and
wherein displaying the selected hypertext documents comprises:
displaying an indication of the common topic corresponding to each group.

8. The method according to claim 1, wherein calculating the affinity indicator for each pair of selected hypertext documents, grouping the selected hypertext documents into the set of groups, and displaying the selected hypertext documents in an arrangement corresponding to the grouping thereof are performed in response to each event affecting the content of at least one of the selected hypertext documents.

9. The method according to claim 1, further comprising:
saving an indication of the grouping of the selected hypertext documents,
closing the selected hypertext documents,
retrieving the indication of the grouping of the selected hypertext documents, and
re-opening the selected hypertext documents by displaying the selected hypertext documents in the arrangement corresponding to the grouping thereof.

10. The method according to claim 9, further comprising:
monitoring at least one performance metric of the data processing system, wherein saving the indication of the grouping of the selected hypertext documents and closing the selected hypertext documents are performed in response to a detection of a low performance condition according to the at least one performance metric.

11. The method according to claim 9, further comprising:
submitting a session saving command, wherein saving the indication of the grouping of the selected hypertext documents and closing the selected hypertext documents are performed in response to the session saving command.

12. A computer program product comprising a non-transitory computer readable storage medium having a computer readable program stored therein, wherein the computer readable program, when executed on a data processing system, causes the data processing system to:
open a plurality of selected hypertext documents,
create an affinity matrix for each of the selected hypertext documents,
calculate an affinity indicator for each pair of selected hypertext documents in the affinity matrix according to a comparison between semantic information of a content of each selected hypertext document of the pair,
group the selected hypertext documents into a set of groups by assigning each selected hypertext document to at least one group in the set of the groups according to the affinity indicators, wherein a number of selected hypertext documents in each group of the set of groups is limited to a predetermined number of selected hypertext documents and wherein the computer readable program to group the selected hypertext documents into the set of groups further causes the computing device to:
group the selected hypertext documents into a particular group up to the predetermined number of selected hypertext documents by:
initializing the set of groups by assigning each single hypertext document to its own group and setting an affinity index for each group accordingly, and
repeating the steps of:
determining a pair of initialized groups with highest affinity indexes,
merging the pair of initialized groups into a new group,
for each new pair of groups, calculating a sum of the corresponding selected hypertext documents within the group,
determining whether the sum of the corresponding selected hypertext documents exceeds the predetermined number of selected hypertext documents,
blocking each new pair of groups between the new group and each other group to prevent the merging thereof when the sum of the corresponding selected hypertext documents exceeds the predetermined number of selected hypertext documents, and calculating the affinity index for each new group according to the affinity index between the initialized groups and the corresponding other group, until the highest affinity index is lower than the affinity threshold and the number of the groups is lower than or equal to a predetermined number of groups, and display the selected hypertext documents in an arrangement corresponding to the grouping thereof.

13. A data processing system comprising:
a processor; and
a memory coupled to the processor, wherein the memory comprises instructions which, when executed by the processor, cause the processor to:
open a plurality of selected hypertext documents,
create an affinity matrix for each of the selected hypertext documents,
calculate an affinity indicator for each pair of selected hypertext documents in the affinity matrix according to a comparison between semantic information of a content of each selected hypertext document of the pair,
group the selected hypertext documents into a set of groups by assigning each selected hypertext document to at least one group in the set of the groups according to the affinity indicators, wherein a number of selected hypertext documents in each group of the set of groups is limited to a predetermined number of selected hypertext documents and wherein the instructions to group the selected hypertext documents into the set of groups further causes the processor to:
group the selected hypertext documents into a particular group up to the predetermined number of selected hypertext documents by:
initializing the set of groups by assigning each single hypertext document to its own group and setting an affinity index for each group accordingly, and
repeating the steps of:
determining a pair of initialized groups with highest affinity indexes,
merging the pair of initialized groups into a new group,
for each new pair of groups, calculating a sum of the corresponding selected hypertext documents within the group,
determining whether the sum of the corresponding selected hypertext documents exceeds the predetermined number of selected hypertext documents,
blocking each new pair of groups between the new group and each other group to prevent the merging thereof when the sum of the corresponding selected hypertext documents exceeds the predetermined number of selected hypertext documents, and
calculating the affinity index for each new group according to the affinity index between the initialized groups and the corresponding other group, until the highest affinity index is lower than the affinity threshold and the number of the groups is lower than or equal to a predetermined number of groups, and
display the selected hypertext documents in an arrangement corresponding to the grouping thereof.

14. The data processing system according to claim 13, wherein the selected hypertext documents are web pages.

15. The data processing system according to claim 13, wherein the instructions to calculate the affinity indicator for each pair of selected hypertext documents causes the processor to:
extract the semantic information of each selected hypertext document from the selected hypertext document.

16. The data processing system according to claim 13, wherein the instructions to group the selected hypertext documents into the set of groups causes the processor to:
group the selected hypertext documents according to an affinity threshold for the affinity indicators.

17. The data processing system according to claim 13, wherein groups in the sets of grow s is limited to the redetermined number of groups and wherein the instructions to group the selected hypertext documents into the set of groups causes the processor to:
group the selected hypertext documents into the predetermined number of groups.

* * * * *